United States Patent [19]
Brown et al.

[11] Patent Number: 6,096,255
[45] Date of Patent: Aug. 1, 2000

[54] METHOD FOR MAKING MULTI-LAYERED GOLF BALL

[75] Inventors: Robert A. Brown, Mattapoisett; Christopher Cavallaro, Canton, both of Mass.

[73] Assignee: Acushnet Company, Fairhaven, Mass.

[21] Appl. No.: 09/188,893

[22] Filed: Nov. 10, 1998

Related U.S. Application Data

[63] Continuation-in-part of application No. 08/902,351, Jul. 29, 1997, abandoned, which is a continuation-in-part of application No. 08/615,346, Mar. 11, 1996, Pat. No. 5,683,312.

[51] Int. Cl.[7] .................................................. B29C 43/18
[52] U.S. Cl. .......................... 264/248; 264/239; 264/250; 264/322; 156/228; 156/245
[58] Field of Search .................................. 473/354, 377; 264/322, 250, 239, 248; 156/228, 245

[56] References Cited

U.S. PATENT DOCUMENTS

| | | | |
|---|---|---|---|
| 1,505,816 | 8/1924 | Steele | 249/119 |
| 3,933,967 | 1/1976 | Taylor | 264/248 |
| 5,098,104 | 3/1992 | Kane | 273/220 |
| 5,150,906 | 9/1992 | Molitor et al. | 273/220 |

*Primary Examiner*—Stephen F. Gerrity
*Assistant Examiner*—Rhonda E. Sands
*Attorney, Agent, or Firm*—Pennie & Edmonds LLP

[57] ABSTRACT

The present invention provides a golf ball and a method for making the ball. Two cups are molded from an elastomer separately from a center. In one embodiment of the method, the cups are molded on both sides of a center mold plate with hemispherical protrusions. The protrusions force the elastomer cup material into cavities in outer mold plates on either side of the center mold plate, thus forming cups with cavities. The solid or fluid-filled center is placed within the cup cavities, and the cups are joined, preferably by raising the temperature of the mold above the cure activation temperature of the cup material. In some embodiments of the cups, the cups can be formed with non-planar mating surfaces that mesh with each other. The non-planar mating surfaces preferably have a pattern that is symmetrical about the cavities, such as concentric ridges or a tongue and a groove.

10 Claims, 17 Drawing Sheets

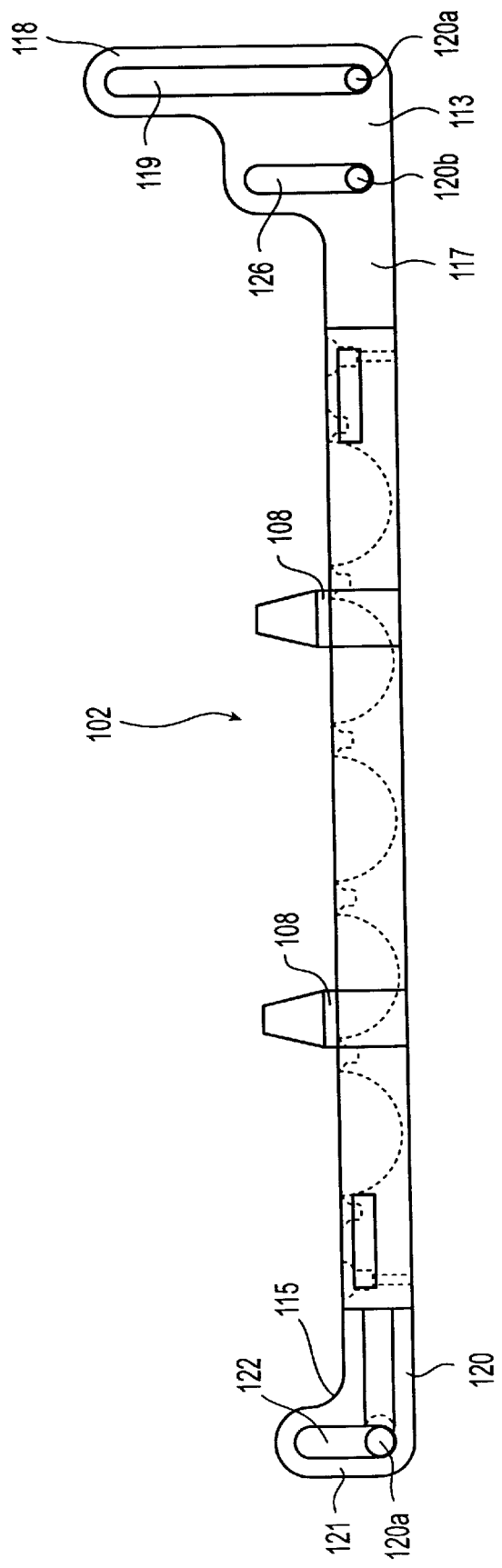

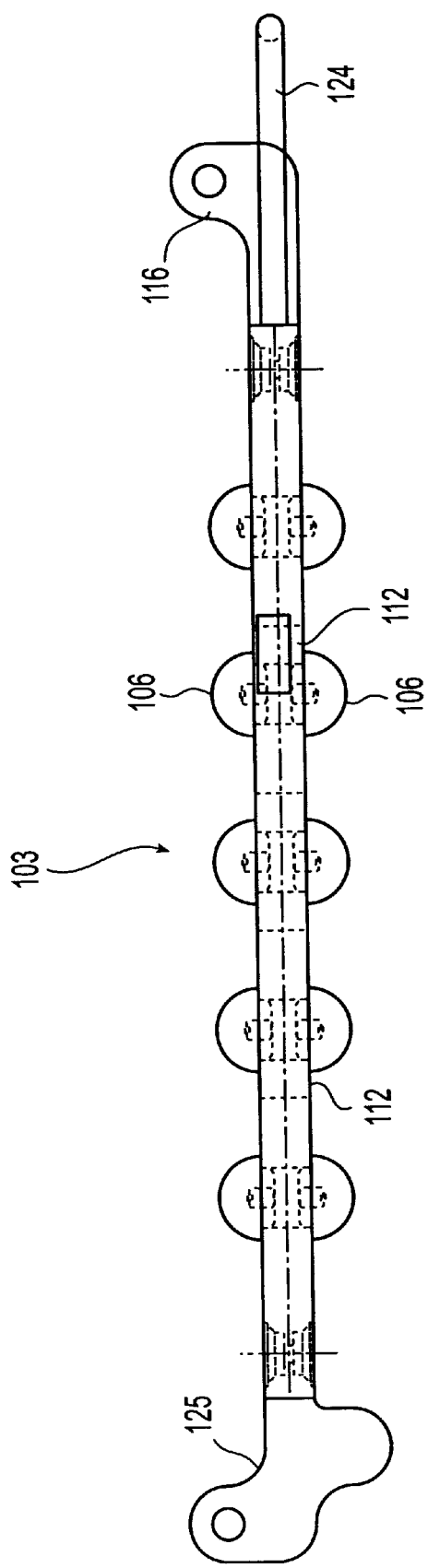

METHOD FOR MAKING MULTI-LAYERED GOLF BALL

This is a continuation-in-part application of application Ser. No. 08/902,351, filed Jul. 29, 1997 (now abandoned), which is a continuation-in-part application of application Ser. No. 08/615,346, filed Mar. 11, 1996 (now U.S. Pat. No. 5,683,312.

FIELD OF THE INVENTION

The present invention is directed to a method for making the golf ball. More particularly, the invention is directed to a method of forming a multi-layered golf ball by forming a plurality of core parts around a center.

BACKGROUND OF THE INVENTION

Generally, golf balls have been classified as solid balls or wound balls. Solid balls are generally comprised of a solid polymeric core and a cover. These balls are generally easy to manufacture, but are regarded as having limited playing characteristics. Wound balls are comprised of a solid or liquid-filled center surrounded by tensioned elastomeric material and a cover. Wound balls generally have good playing characteristics, but are more difficult to manufacture than solid balls.

The prior art is comprised of various golf balls that have been designed to provide optimal playing characteristics. These characteristics are generally the initial velocity and spin of the golf ball, which can be optimized for various players. For instance, certain players prefer to play a ball that has a high spin rate for playability. Other players prefer to play a ball that has a low spin rate to maximize distance. However, these balls tend to be hard feeling and difficult to control around the greens.

Manufacturers have molded layers around a solid center by placing a preformed center between two blocks of core material in a spherical compression mold, and closing the mold. This is done in the manufacture of golf balls sold by Kamatari. This process, however, provides little control over the ultimate placement of the center within the golf ball core. Large variations in the location of the center can result.

The prior art also provides for the manufacture of double cover golf balls. This is generally accomplished by injection molding a first and then a second cover layer around a core. This system, however, requires complex injection molds, usually with retractable pins within mold to properly position the core. Moreover, this system generally works better with thermoplastic materials.

Therefore, what is desired is a method of molding multi-layer cores or multi-layer covers that requires simple tools and ensures properly centered balls.

SUMMARY OF THE INVENTION

The invention provides a method for making a golf ball, particularly suited for golf balls that have a multi-layer core with a solid or fluid center. The method comprises forming a solid or fluid-filled center, and then molding from elastomeric material, preferably polybutadiene, core parts, such as hemispherical cups, that when combined form a hollow sphere.

The formed cups each have a hemispherical cavity, produced by a protrusion of a mold part. The center is placed between the two cups, which are then joined to form an outer layer of the core. When the cups are joined, the hemispherical cavities together form a spherical cavity, now occupied by the center, and the cups themselves form the outer layer of the core. Thus, the center is easily positioned concentrically within the finished ball. Finally, a cover is molded around the core. This process results in accurate and repeatable central placement of the center within the core.

Preferably, the process is not susceptible to unwanted deformation of a soft center during placement within the cups' cavities because the method does not depend on the rigidity of the center in the shaping of the cups. Moreover, as the cups are molded separately from the center, the process avoids deforming a soft center made of a softer solid material or containing a fluid because compressing the cup material about the center is not required.

In a preferred method according to the invention, the two cups are molded by placing material in top and bottom mold cavities that are alignable with one another. A single protrusive mold part that has hemispherical protrusions on each side is inserted between and aligned with the upper and lower mold cavities and the mold is closed to form the two, non-vulcanized cups from the material. The single protrusive mold part is then removed and the center is inserted into one of the cups. The mold is then closed again to join the cups around the center.

Most preferably, the cups are formed from a thermoset material. When the cups are formed, the mold is heated to a temperature that makes the material more pliable, but lower than the cur activation temperature. Then, after the center is inserted between the two cups, the mold is closed and heated to a second temperature that is greater than the cure activation temperature so that the two cups are joined together.

In one embodiment, the hemispherical cups have substantially flat mating surfaces. In another embodiment, the mating surfaces are non-planar and define a pattern that is symmetrical about the center. For example, the pattern can include concentric ridges with a tongue and groove configuration that mesh when the two cups are joined. The non-planar surfaces improve the shear strength of the finished ball where the cups are joined and retain more characteristics of the cup material throughout the joining region than do balls with flat mating surfaces.

The present invention also includes an improved mold construction for forming the golf ball core having an outer layer. Preferably, the mold is comprised of three parts which include a bottom mold plate with mold cavities, a top mold plate with corresponding mold cavities and a single center mold plate with corresponding protrusions. The three mold plates are hinged together such that they form a foldable mold with the top mold plate on one side of the center mold plate, and the bottom mold plate on other side of the center mold plate. In this manner, the mold can be operated by placing material in the top and bottom mold cavities, folding the center mold plate over the top mold plate and folding the center mold plate and top mold plate over the bottom mold plate. Thus, forming a folded assembly. The folded assembly is placed in a press and heated and compressed to form upper and lower cups from the material. The folded assembly is removed from the press and unfolded. The ball centers are then placed in the cups that are left in the top mold cavities. The bottom mold plate with the other cups is then folded over the top mold plate. This assembly is then placed back into the press, heated and compressed to join the cups and form the outer layer over the centers.

BRIEF DESCRIPTION OF DRAWINGS

FIG. 12A is a side view of the lower mold plate of FIG. 12;

FIG. 14A is a side view of the center mold plate of FIG. 14.

DESCRIPTION OF THE PREFERRED EMBODIMENTS

Figure 1:
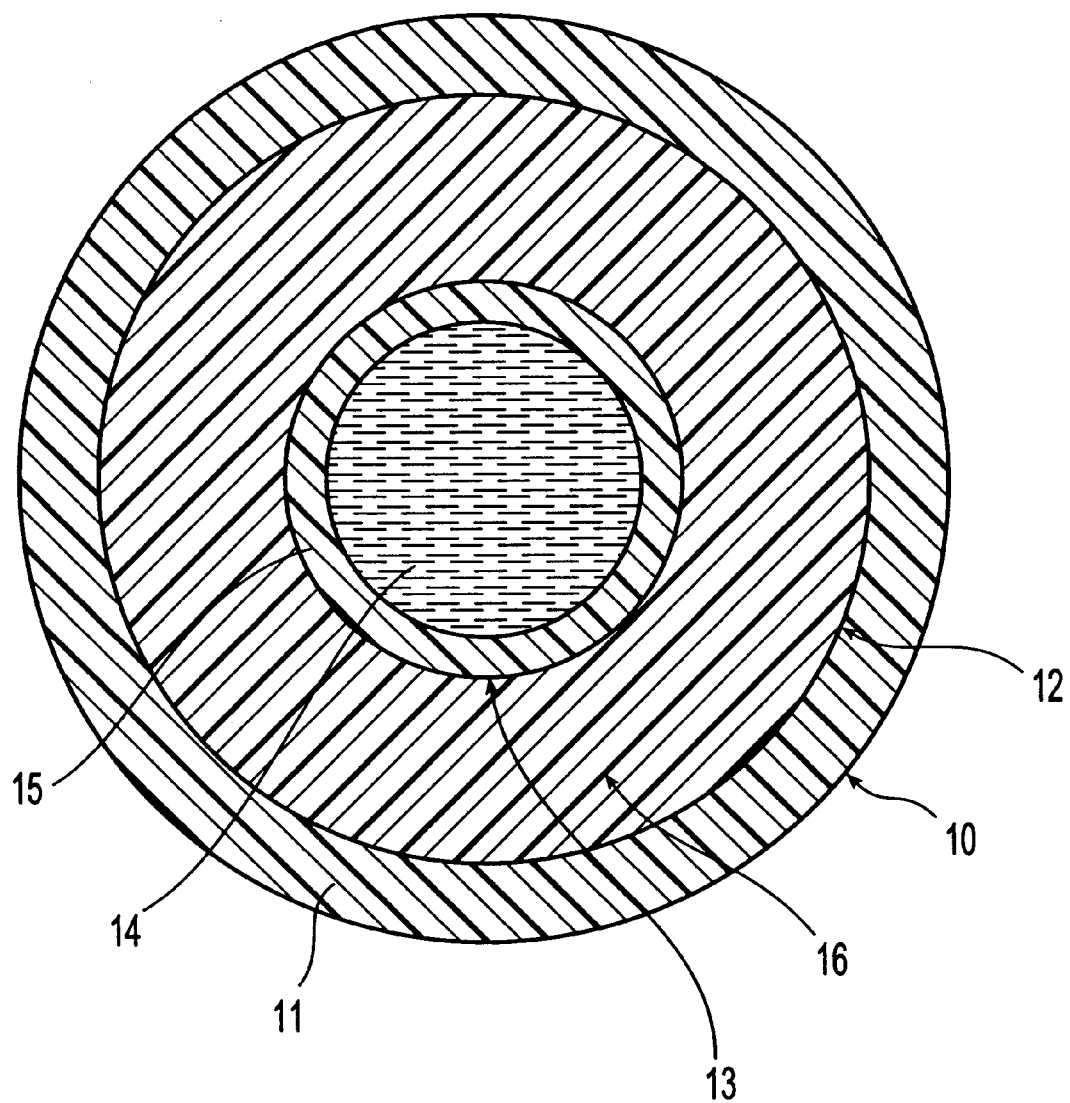
FIG. 1 is a sectional view of a liquid filled ball of the present invention.

Referring to FIG. 1, ball 10 includes a cover 11 and a core 12. The core 12 has a center or inner sphere 13 that is disposed concentrically therein and can be comprised of a fluid center 14 in a cavity within an inner layer 15. The core 12 also has an outer layer 16, which surrounds the center 13.

Figure 2:
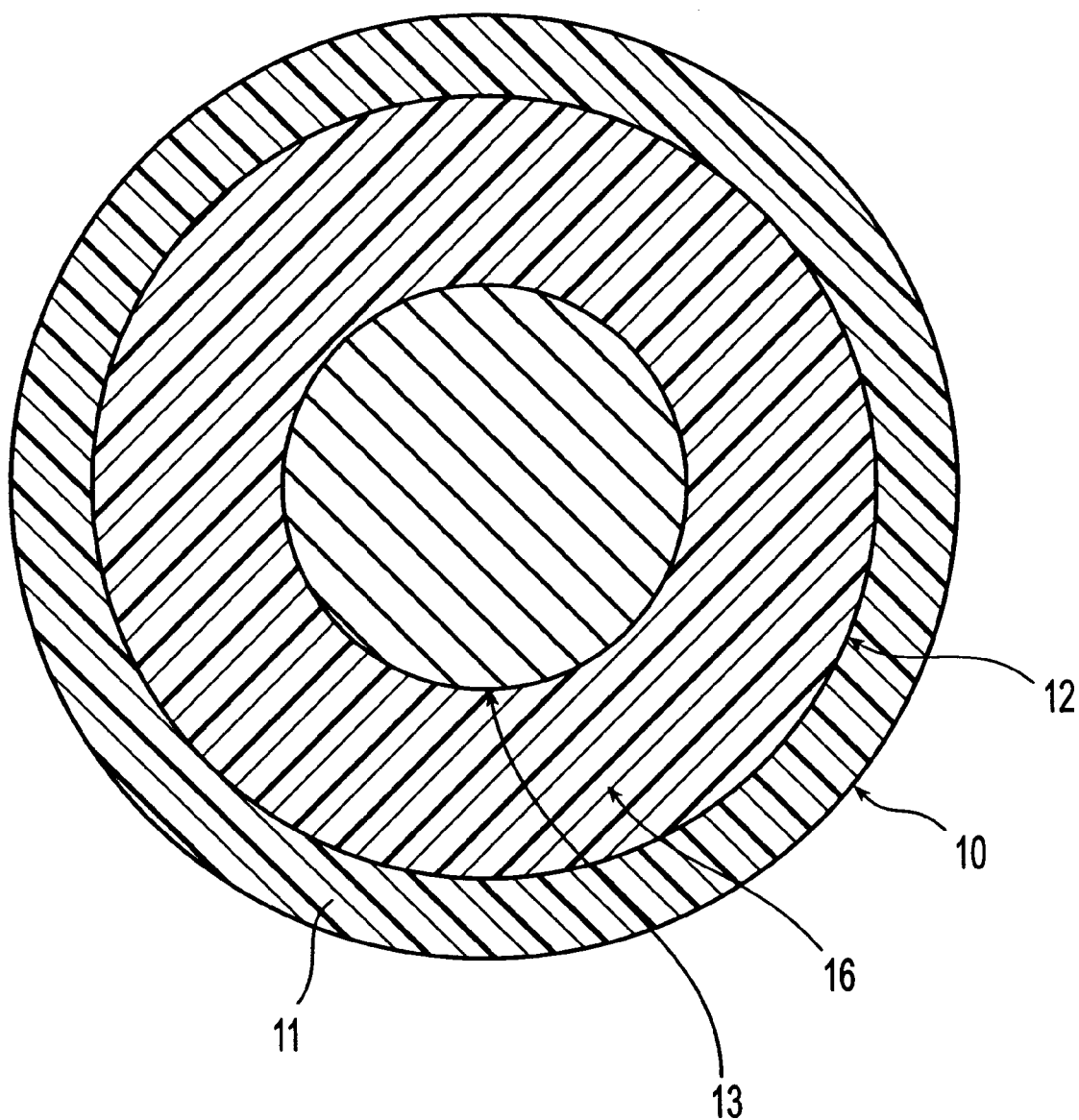
FIG. 2 is a sectional view of a completely solid ball according to the present invention.

Referring to FIG. 2, ball 10 includes a cover 11 and a core 12. The core 12 has a center or inner sphere 13 that is disposed concentrically therein and which preferably comprises a solid sphere as set forth below. The core 12 also has an outer layer 16, which surrounds the center 13.

The cover 11 provides the interface between the ball 10 and a club and other objects such as trees, cart paths, and grass. Properties that are desirable for the cover are good moldability, high abrasion resistance, high tear strength, high resilience, and good mold release, among others.

The cover 11 can be comprised of polymeric materials such as ionic copolymers of ethylene and an unsaturated monocarboxylic acid, which are available under the trademark "SURLYN" of E.I. DuPont De Nemours & Company of Wilmington, Del. or "IOTEK" or "ESCOR" from Exxon. These are copolymers or terpolymers of ethylene and methacrylic acid or acrylic acid partially neutralized with zinc, sodium, lithium, magnesium, potassium, calcium, manganese, nickel or the like.

In accordance with the preferred balls, the cover 11 has a thickness to generally provide sufficient strength, good performance characteristics and durability. Preferably, the cover 11 is of a thickness from about 0.03 inches to about 0.12 inches. More preferably, the cover 11 is about 0.04 to 0.09 inches in thickness and, most preferably, is about 0.05 to 0.085 inches in thickness.

In one preferred embodiment, the cover 11 can be formed from mixtures or blends of zinc, lithium and/or sodium ionic copolymers or terpolymers.

The Surlyn® resins for use in the cover 11 are ionic copolymers or terpolymers in which sodium, lithium or zinc salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This invention can likewise be used in conjunction with homopolymeric and copolymer materials such as:

(1) vinyl resins such as those formed by the polymerization of vinyl chloride, or by the copolymerization of vinyl chloride with vinyl acetate, acrylic esters or vinylidene chloride.

(2) Polyolefins such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using single-site catalyst.

(3) Polyurethanes such as those prepared from polyols and diisocyanates or polyisocyanates and those disclosed in U.S. Pat. No. 5,334,673.

(4) Polyureas such as those disclosed in U.S. Pat. No. 5,484,870.

(5) Polyamides such as poly(hexamethylene adipamide) and others prepared from diamines and dibasic acids, as well as those from amino acids such as poly (caprolactam), and blends of polyamides with Surlyn, polyethylene, ethylene copolymers, ethyl-propylene-non-conjugated diene terpolymer, etc.

(6) Acrylic resins and blends of these resins with poly vinyl chloride, elastomers, etc.

(7) Thermoplastics such as the urethanes, olefinic thermoplastic rubbers such as blends of polyolefins with ethylene-propylene-non-conjugated diene terpolymer, block copolymers of styrene and butadiene, isoprene or ethylene-butylene rubber, or copoly (ether-amide), such as PEBAX sold by ELF Atochem.

(7) Polyphenylene oxide resins, or blends of polyphenylene oxide with high impact polystyrene as sold under the trademark "Noryl" by General Electric Company, Pittsfield, Mass.

(8) Thermoplastic polyesters, such as polyethylene terephtha late, polybutylene terephtha late, polyethylene terephthalate/glycol modified and elastomers sold under the trademarks "Hytrel" by E.I. DuPont De Nemours & Company of Wilmington, Del. and "Lomod" by General Electric Company, Pittsfield, Mass.

(9) Blends and alloys, including polycarbonate with acrylonitrile butadiene styrene, polybutylene terephthalate, polyethylene terephithalate, styrene maleic anhydride, polyethylene, elastomers, etc. and polyvinyl chloride with acrylonitrile butadiene styrene or ethylene vinyl acetate or other elastomers. Blends of thermoplastic rubbers with polyethylene, propylene, polyacetal, nylon, polyesters, cellulose esters, etc.

Preferably, the cover 11 is comprised of polymers such as ethylene, propylene, butene-1 or hexane-1 based homopolymers and copolymers including functional monomers such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly (phenylene sulfide), acrylonitrile-butadiene, acrylic-styrene-acrylonitrile, poly (ethylene terephthalate), poly (butylene terephthalate), poly (ethylene vinyl alcohol), poly (tetrafluoroethylene) and their copolymers including functional comonomers and blends thereof. Still further, the cover 11 is preferably comprised of a polyether or polyester thermoplastic urethane, a thermoset polyurethane, a low modulus ionomer such as acid-containing ethylene copolymer ionomers, including E/X/Y terpolymers where E is ethylene, X is an acrylate or methacrylate-based softening comonomer present in 0–50 weight percent and Y is acrylic or meterylic acid present in 5–35 weight percent. More preferably, in a low spin rate embodiment designed for maximum distance, the acrylic or methacrylic acid is present in 15–35 weight percent, making the ionomer a high modulus ionomer. In a high spin embodiment, the acid is present in 10–15 weigh percent or a blend of a low modulus ionomer with a standard ionomer is used.

The outer layer 16 of the core is preferably made of thermoset rubber base materials, including those conventionally employed in golf ball cores. The conventional materials for such cores include compositions having a base rubber, a crosslinking agent, a filler and a co-crosslinking agent. The base rubber is typically a synthetic rubber like 1,4-polybutadiene having a cis-structure of at least 40%. Natural rubber, polyisoprene rubber and/or styrene-butadiene rubber may optionally be added to the 1,4-polybutadiene. The initiator included in the core composition can be any polymerization initiator which decomposes during the cure cycle. The crosslinking agent includes a metal salt of an unsaturated fatty acid such as sodium, zinc, lithium or magnesium salt or an unsaturated fatty acid having 3 to 8 carbon atoms such as acrylic or methacrylic acid. The filler typically includes materials such as zinc oxide, barium sulfate, silica, calcium carbonate, zinc carbonate, regrind and the like.

Alternatively, the outer layer 16 may be comprised of thermoplastic elastomers such as a thermoplastic polyesterester, thermoplastic polyetherester, dynamically vulcanized thermoplastic elastomers, functionalized styrene-butadiene elastomers, thermoplastic urethanes or metallocene polymers or blends thereof.

The present invention is not limited to a particular outer layer 16 material, and the materials are well known to those of ordinary skill in the art. The present invention is generally directed to the use of a standard thermoset material, but those of ordinary skill will easily know how to convert the process for using thermoplastic materials.

The outer layer 16 preferably has an outside diameter in the range of 80 to 98% of the finished ball diameter and an inner diameter in the range of 30 to 70% of the finished ball diameter. Preferably, the outer layer 16 has an inner diameter of approximately 0.8 to 1.5 inches and, more preferably, an inner diameter of approximately 1.0 to 1.3 inches. Preferably, the outer layer 16 has an inner diameter of approximately 1.1–1.2 inches. Yet further still, the outer layer 16 has an outside diameter in the range of 1.3 to 1.7 inches and, more preferably, approximately 1.5 to 1.6 inches.

A golf ball incorporating these measurements can be designed with the various attributes discussed below, such as specific gravity, resiliency and hardness, to provide the desired playing characteristics, such as spin rate and initial velocity.

Figure 3:
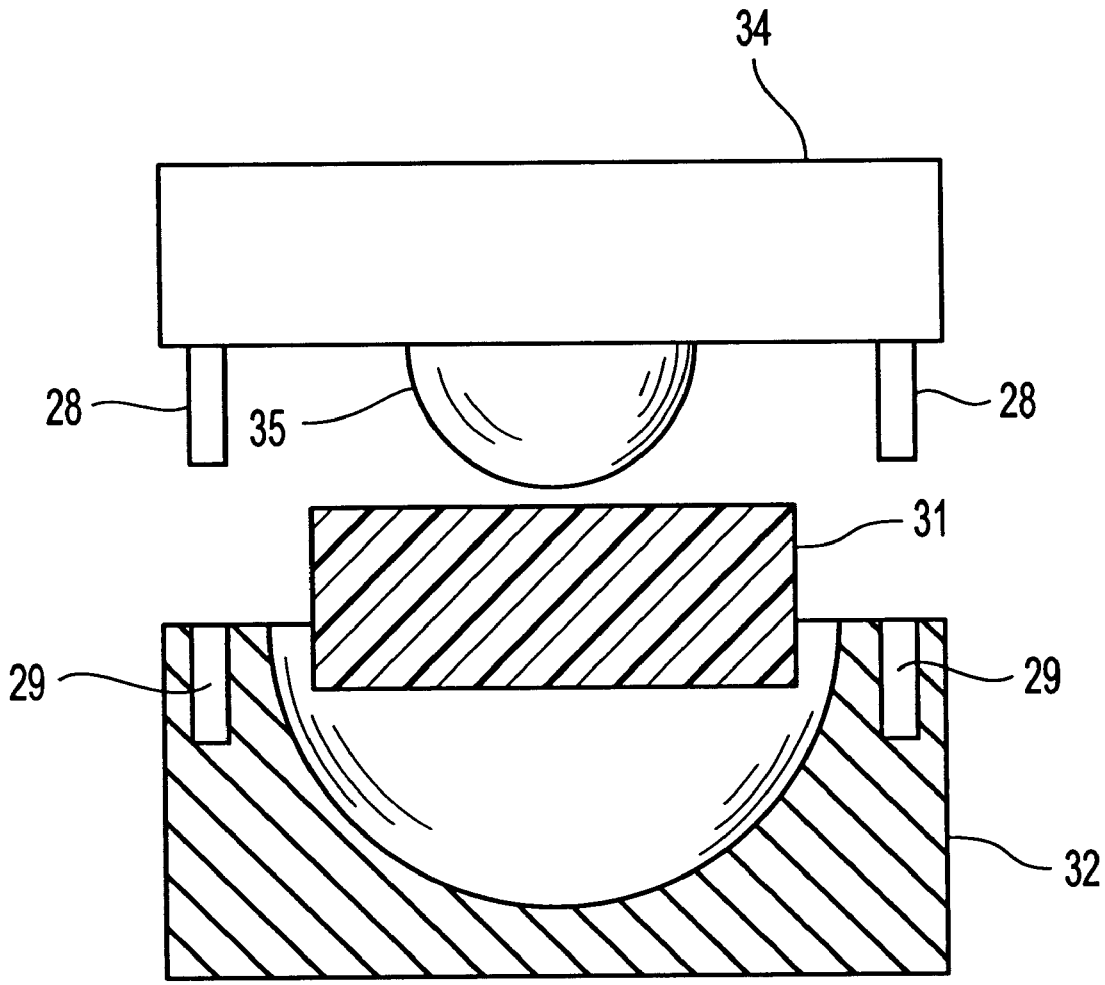
FIG. 3 is a partial, sectional view of a mold preforming a single cup.
Figure 4:
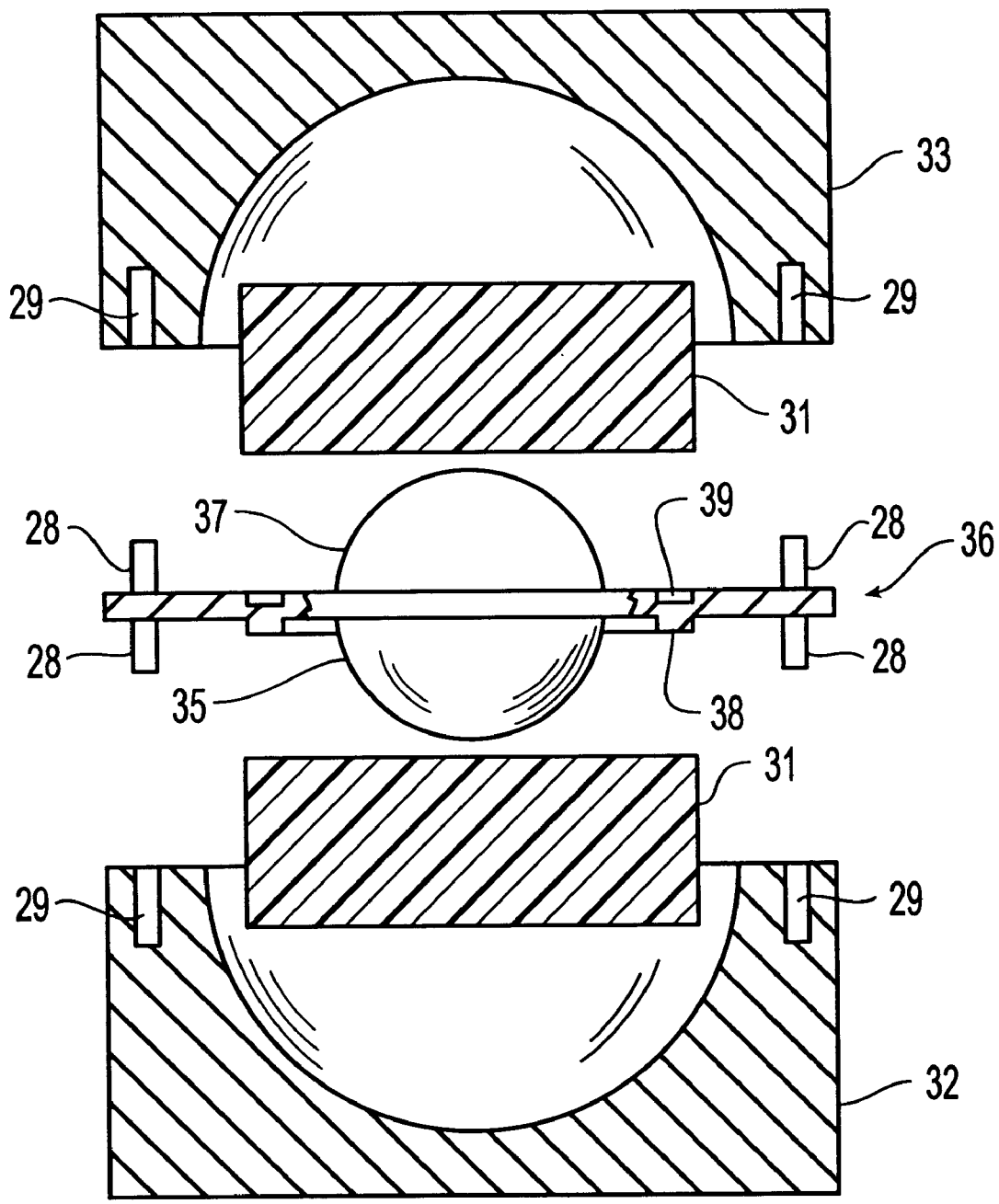
FIG. 4 is a partial, sectional view of molds preforming outer layer cups according to the present invention.
Figure 5:
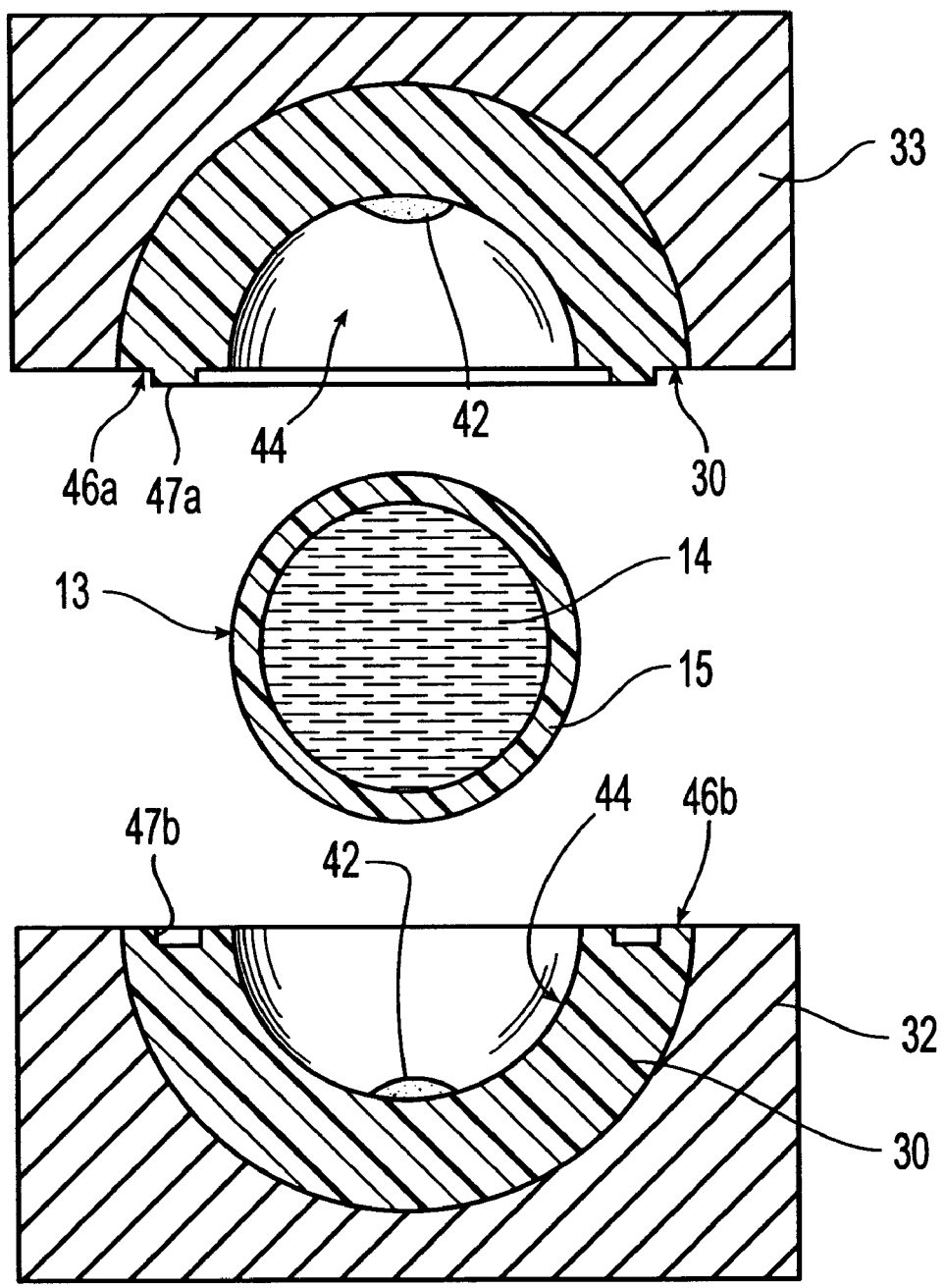
FIG. 5 is a sectional view of molds and joining cups of a core outer layer.

Turning to FIGS. 1–5, the method for making the ball will be discussed. The center 13 is either a solid center or a fluid-filled center. A first cup 30 is formed as shown in FIG. 3, by compression molding cup or material 31, preferably polybutadiene, between a first substantially hemispherical concave mold part 32 and a protrusive mold part 34. The protrusive mold part 34 has a first substantially hemispherical protrusion 35 that faces the first concave mold part 32. The protrusive mold part 34 includes a plurality of alignment pins 28 that mate with a plurality of bores 29 in the concave mold part 32. As the mold parts 32 and 34 are moved toward each other to form the first cup, the pins 28 align with the bores 29 to make sure that the hemispherical protrusion 35 is concentric or coaxially aligns with the concave mold part 32. A second cup 30 (as shown in FIG. 5) is then made in the same manner.

Alternatively and preferably, as shown in FIGS. 4 and 5, the two cups 30 are simultaneously compression molded about a single protrusive mold part 36 that has first and second protrusions 35 and 37 respectively. The mold part 36 further includes non-planar surfaces 38 and 39. The surface 38 contains a tongue pattern that circumscribes the protrusions 35. The surface 39 includes a groove that circumscribes the protrusion 37.

First and second hemispherical concave mold parts 32 and 33 are positioned opposite each other and protrusive mold part 36 is placed between the concave mold parts 32 and 33. Alignment pins 28 mate with the alignment bores 29 to make sure that the protrusions 35 and 37 are concentric or coaxially aligned with the concave mold parts. When forming the cups it is preferred that material 31 includes more material than that necessary to form the cups. For example, it is preferable to use 20% more material than necessary.

Figure 6:
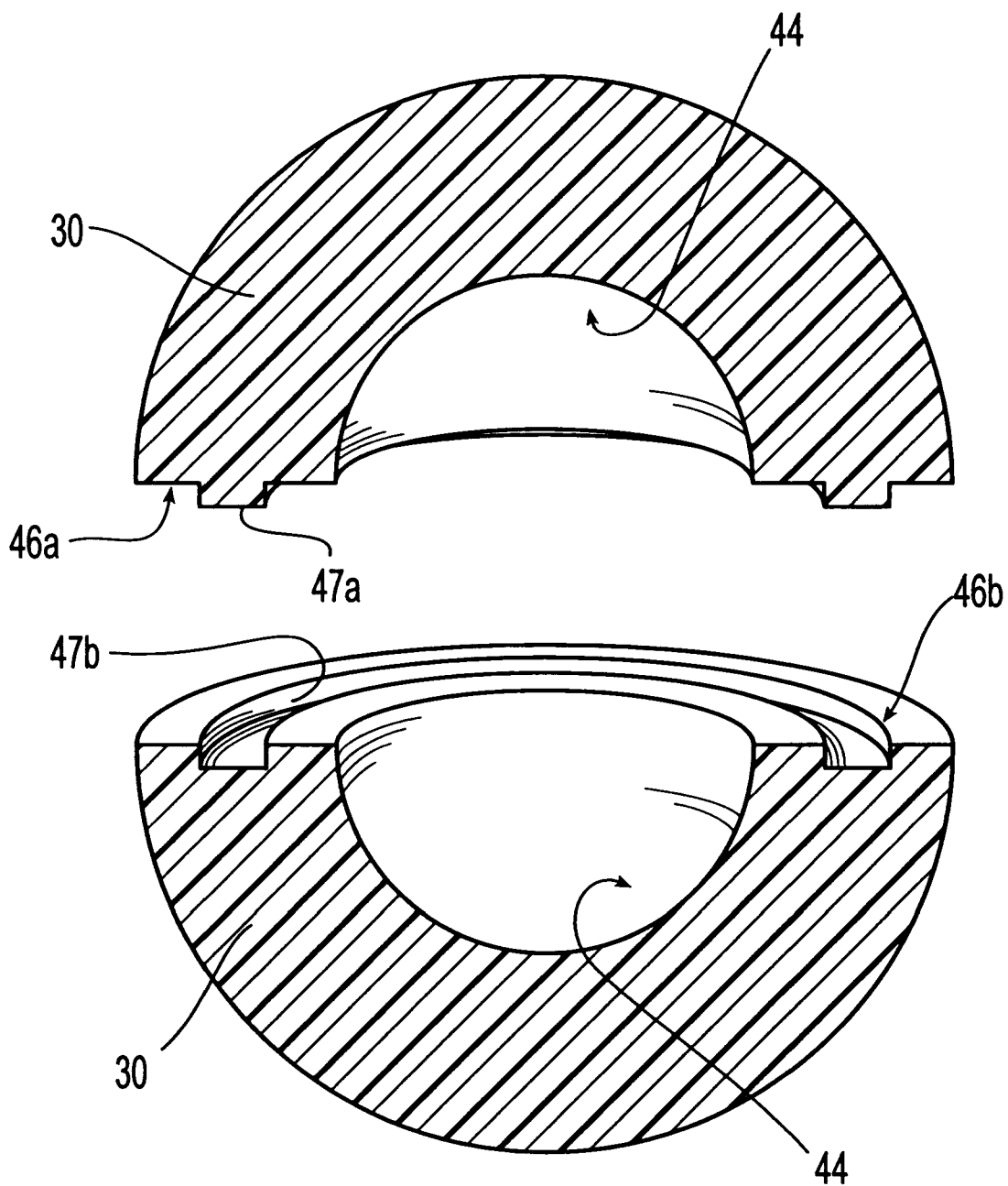
FIG. 6 is a sectional view of the cups of FIG. 5.

FIG. 5 shows two concave mold parts 32 and 33 after cups 30 have been molded. Each hemispherical cup 30 has a hemispherical cavity 44. Disposed around the cavities 44, the cups 30 have mating surfaces 46a and 46b, which are substantially non-planar in this embodiment. Referring to FIGS. 4–6, during molding the non-planar surfaces 46a and 46b of the cups are molded to each have a pattern concentric with each cup. The surface 46a includes a tongue 47a due to the groove 39 in the mold part 36. The surface 46b includes a groove 47b due to the tongue 38 in the mold part 36. The mating surfaces 46a and 46b are arranged to mesh with each other so that the tongue 47a engages the groove 47b.

As shown in FIG. 5, the center 13 is placed in the cups 30, and the two cups 30 are joined. Cups 30 are preferably kept in their respective hemispherical molds 32 and 33 during this step. The cups are compressed together at an elevated temperature and high pressure and the excess material of each cup flows, mixes together and crosslinks. Since the temperature during this step is raised above the cure activation temperature of the cup material, the material crosslinks. In the embodiment shown in FIG. 4, joining the cups may be achieved by removing protrusive mold part 36 and running the compression mold through a second cycle, heating and compressing the cups 30 together.

Turning again to FIG. 5, an adhesive 42 can be applied such that it bonds the center 13 to the cups 30. The adhesive 42 is placed within the cup cavities 44 and the adhesive 42 is spread evenly on the center 13 upon joining the cups 30 to one another.

A preferred adhesive for use with polybutadiene cups 30 is an epoxy, formed by blending low viscosity liquid resins, and formulated to be flexible in its cured state. A suitable epoxy is formed by mixing an approximately 1:1 volume ratio of about 83 parts by weight of AB-82 hardener into 100 parts by weight of Epoxy Resin #1028, both of which are sold by RBC Industries, Inc. In its liquid state, the epoxy is ideal for use in metering, mixing, and dispensing equipment. This epoxy is preferably cured at 77° F. for 18 to 24 hours, at 95° F. for 6 hours, at 120° F. for 3 hours, or at 150° F. for 1 hour. The cured adhesive's physical properties resemble those of elastomeric urethane. It exhibits an Izod impact strength 5.50 ft. lbs/in. of notch, a tensile strength at 25° C. of 2,200 psi, a compressive strength at 25° C. of 6,000 psi, and a Shore D hardness of 45. Preferably, the Shore D hardness of the cured adhesive is within 20 Shore D of the hardness of the elastomeric cup material.

Figure 7:
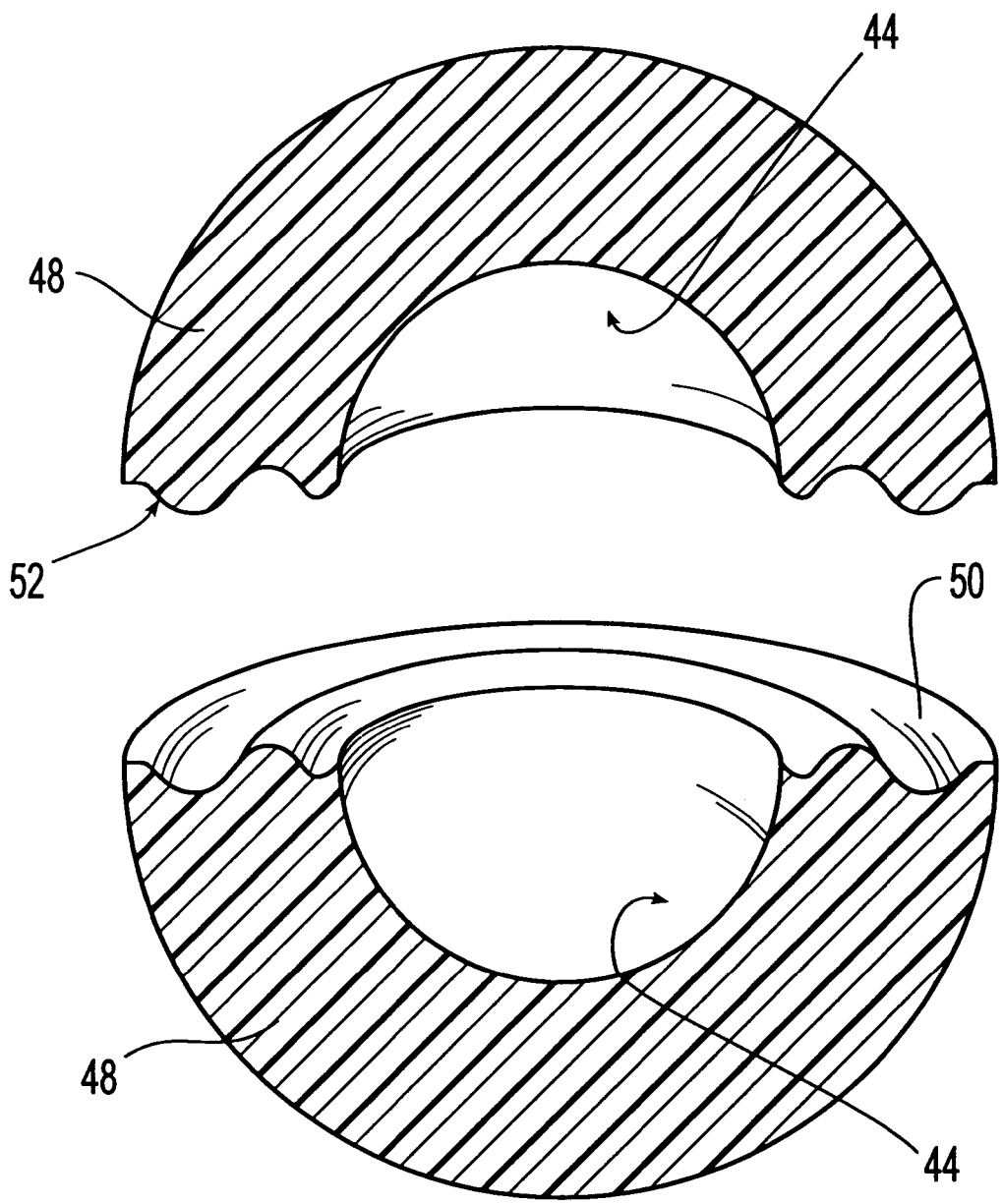
FIGS. 7 and 8 are sectional views of cups with other embodiments of the mating surfaces shown in FIG. 6.
Figure 8:
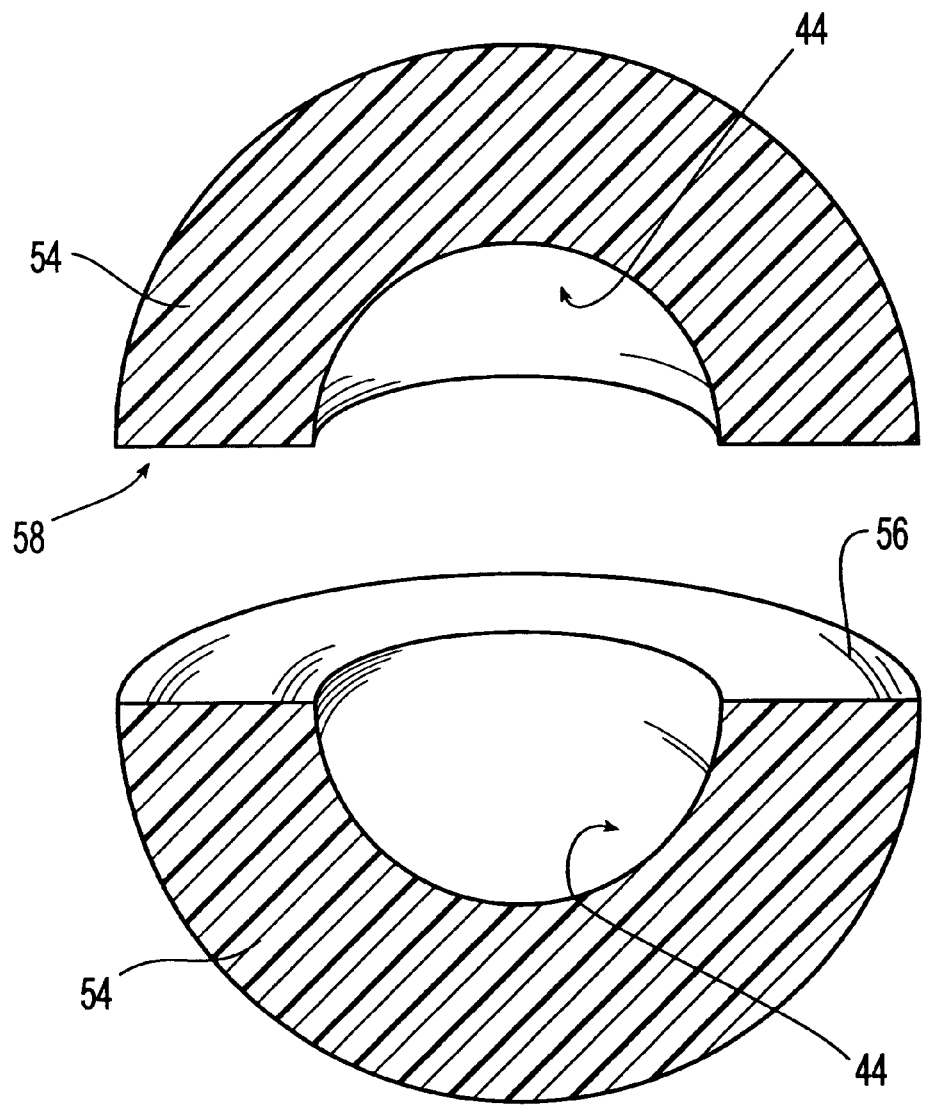

FIGS. 7 and 8 show other embodiments of cups 48 and 54, respectively, that have mating surfaces similar to the cups 30 of FIG. 6. Instead of having tongue and groove mating surfaces, cups 48 have non-planar mating surfaces 50 and 52, and cups 54 have substantially flat mating surfaces 56 and 58. The surfaces 50 and 52 each have a circular pattern of ridges that is preferably symmetrical about the cavity 44 of each cup 48. The patterns shown are concentric with the cups 48. The non-planar surfaces 50 and 52 are arranged to mesh with each other. The non-planar mating surfaces are most useful when an adhesive is used to bond the cups together.

Figure 9:
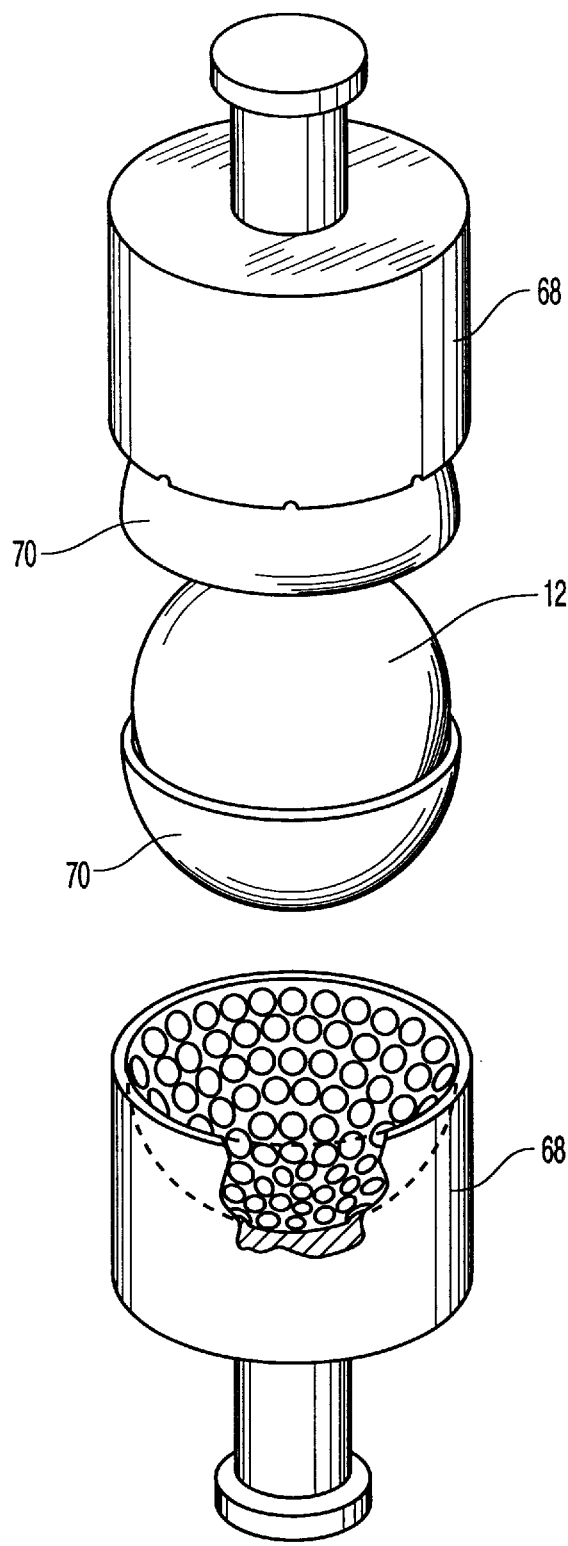
FIG. 9 illustrates a compression mold forming a cover around a golf ball core.
Figure 10:
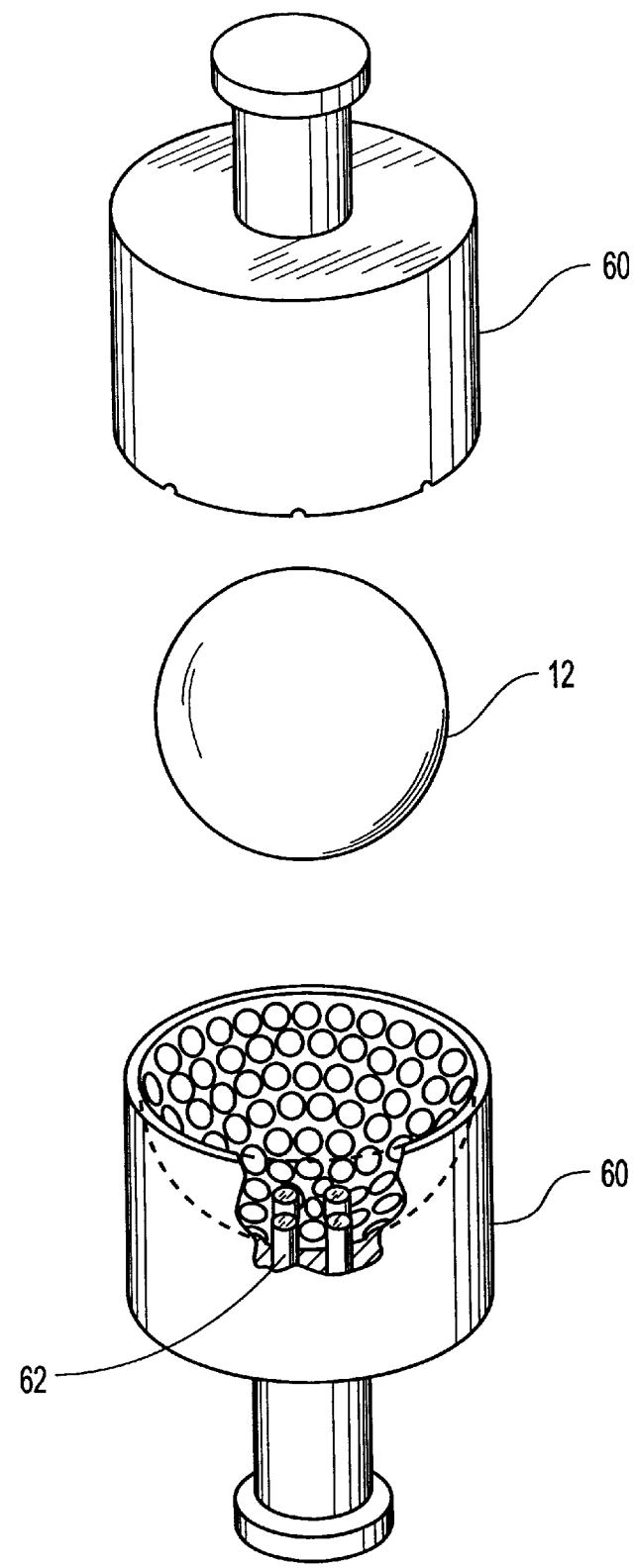
FIG. 10 shows an injection mold forming a cover around a core.

Referring to FIGS. 1–2 and 9–10, once the cups 30 are joined, the cover 11 is formed around the core 12. FIG. 9 illustrates a step of compression molding two halves 70 of a cover 11 around the core 12 in a dimpled mold 68. FIG. 10 shows a step of injection molding the cover material around the core 12 in a dimpled mold 60 with retractable pins 62 that position the core 12 within the dimpled mold 60 and retract before the cover 11 solidifies or cools completely.

Figure 11:
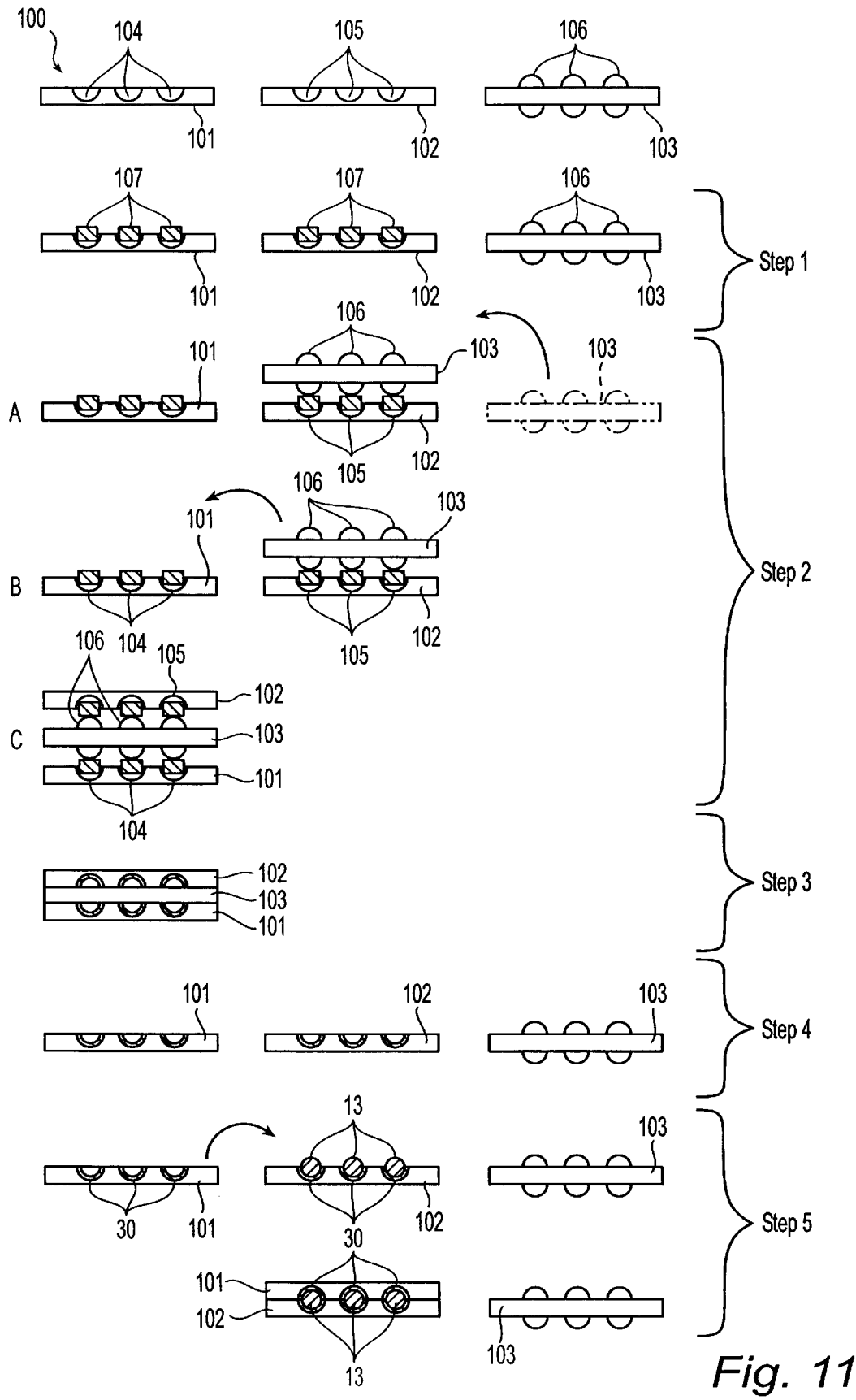
FIG. 11 is a flow chart of the method of forming a two-layer core according to the present invention.

Referring now to FIG. 11, the most preferred molding process for forming the centers uses a mold assembly 100 comprising a lower or bottom mold plate 101, an upper or top mold plate 102 and a center mold plate 103. The bottom and top mold plates 101 and 102 include a plurality of mating cavities 104 and 105 that form a sphere, which is the size of a golf ball core as set forth above. The center mold plate 103 includes a plurality of protrusions 106 on opposite sides of the center mold plate for corresponding with the cavities 104 and 105 of the top and bottom mold plates. The protrusions 106 are hemispheres that are substantially the same size as half of the ball center as set forth above.

First, as shown in Step 1, the core outer layer material 107, such as polybutadiene, is placed in the cavities 104 and 105 of the bottom and top mold plate. Then referring to Step 2A, the center mold plate 103 is moved into alignment with the top mold plate 102 such that the protrusions 106 are located in alignment or coaxial with the cavities 105. However, the center mold plate 103 is positioned over the top mold plate 102 at such a height that the polybutadiene material is only compressed enough to hold the material in place. Then, as shown in Step 2B and 2C, the center mold plate 103 and the top mold plate 102 are moved into alignment with the bottom mold plate 101 such that the protrusions 106 and the cavities 104 and 105 are all in alignment. Again, the center plate 103 is spaced from the bottom mold plate 101 such that the material in the bottom mold plate cavities 104 is only slightly compressed. Thus, a folded assembly is formed.

Once the mold assembly 100 is in position, the folded assembly is placed into a press, heated and compressed, as shown in Step 3. Preferably, the folded assembly 100 is heated to a first temperature that makes the polybutadiene material significantly more pliable, but is below the cure activation temperature. Preferably, the temperature is greater than about 150° F., but less that the cure activation temperature. The most preferred temperature is between about 190° F. and 220° F. The folded assembly 100 is compressed to a pressure sufficient enough to form hemispheres from the polybutadiene material, as shown in Step 4. Preferably, the mold assembly is compressed using a hydraulic preforming pressure of about 230 psi. Using for example, a 28 inch diameter ram for the press that produces 142,000 pounds of force on a mold with 210 cavities, the pressure per cavity is about 675 pounds of force per cavity. However, one of ordinary skill in the art can vary the pressure. The mold is then cooled with cooling water that has a temperature between about 60° F. to 100° F. and preferably the cooling water has a temperature of about 80° F.

After the outer layer material, e.g., the polybutadiene material, has been preformed into hemispheres, the mold assembly is removed from the press and the bottom mold plate 101, top mold plate 102 and the center mold plate 103 are moved out of alignment, as shown in Step 4. Then, turning to Step 5, the ball centers 13 are placed within the hemispherical cups 30 located in the top mold plate 102. The bottom mold plate 101 is moved into alignment with the top mold plate 102 such that the outer layer hemispherical cups 30 form a sphere around the ball centers 13. Then the top and bottom mold plates 101 and 102 are placed back into the press, heated and compressed again. This time, the bottom and top mold plates are heated to a temperature above the cure activation temperature of the cups. Preferably, the mold plates are heated to a temperature of greater than about 290° F. Preferably, the mold plates are compressed using a hydraulic preforming pressure of about 2000 psi. Using for example, a 28 inch diameter ram for the press that produces 1,231,000 pounds of force on a mold with 210 cavities, the pressure per cavity is about 6000 pounds of force per cavity. However, one of ordinary skill in the art can vary the pressure.

Figure 12:
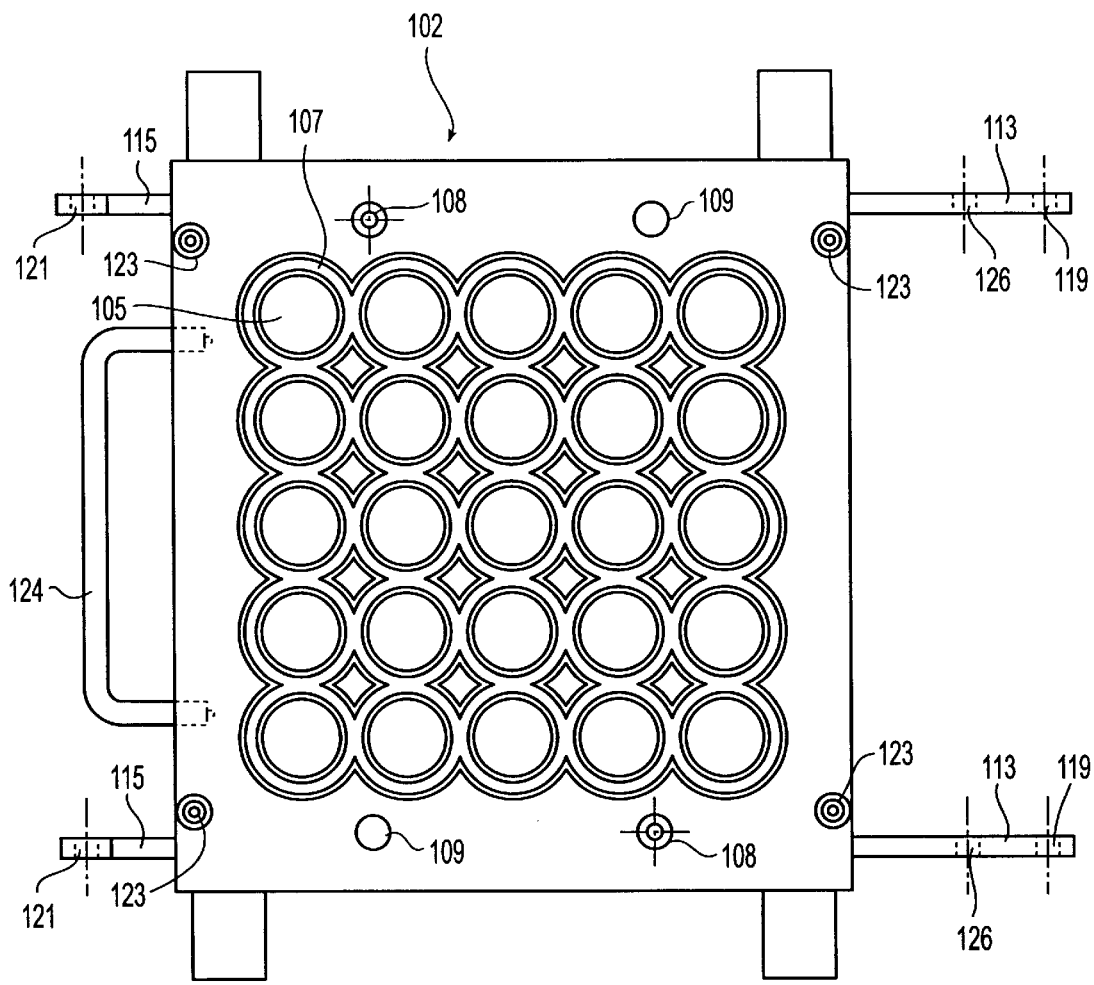
FIG. 12 is a top view of a lower mold plate according to the invention.
Figure 13:
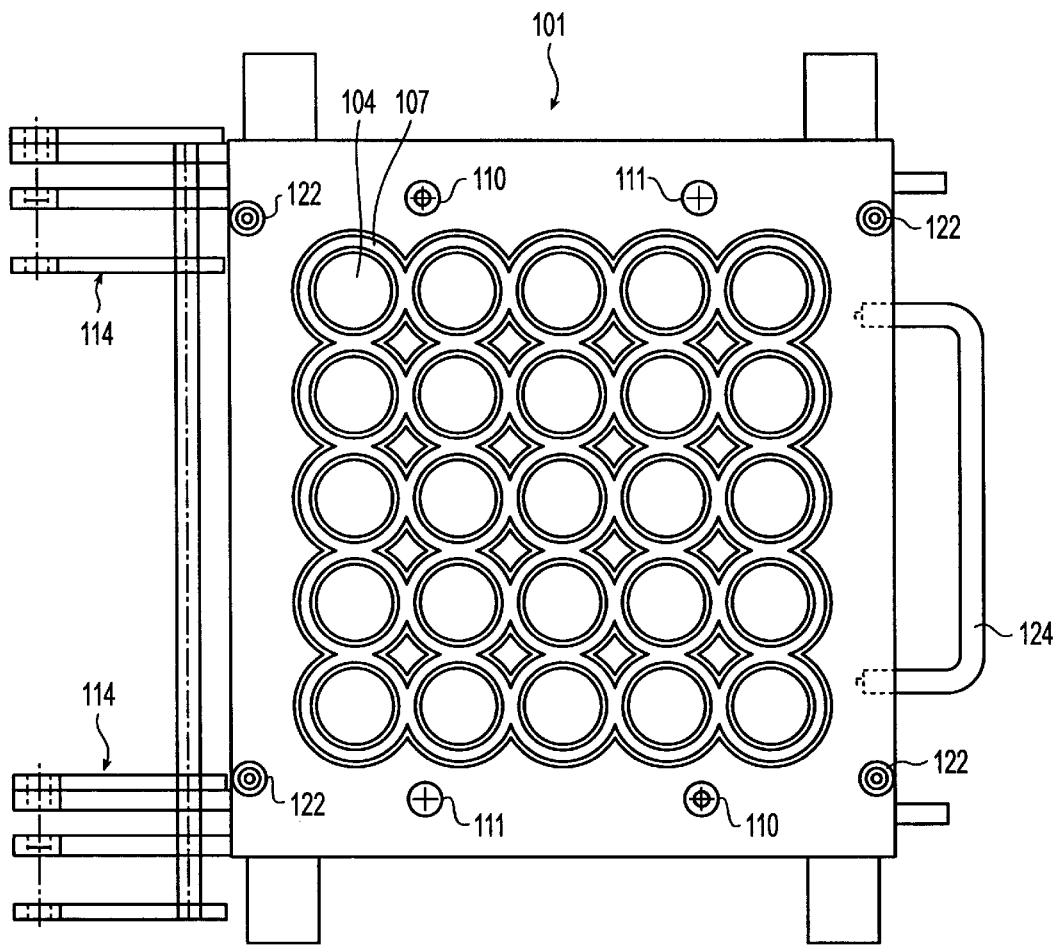
FIG. 13 is a top view of an upper mold plate according to the invention.
Figure 14:
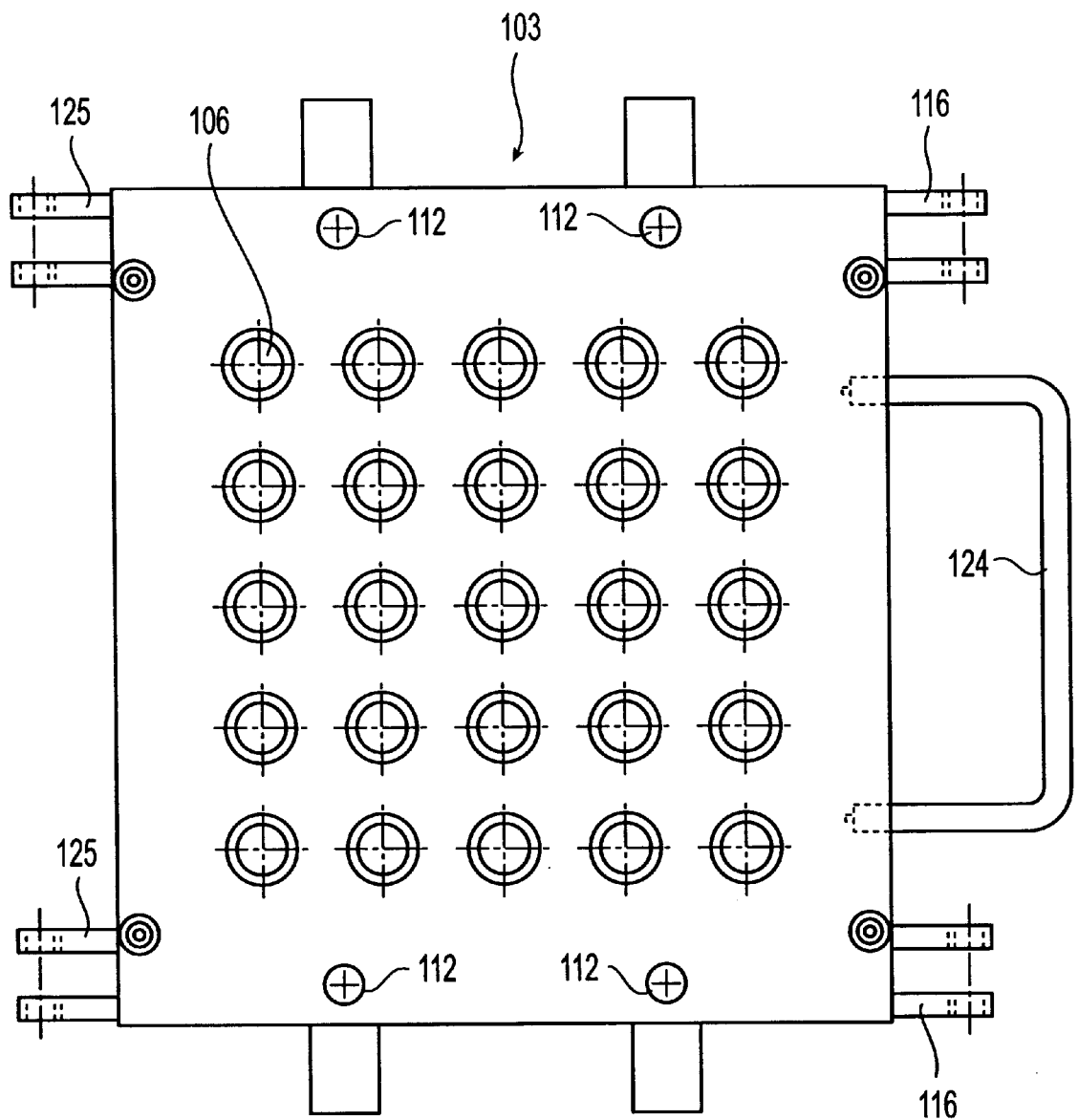
FIG. 14 is a top view of a center mold plate according to the invention.

Referring now to FIGS. 12–14, the top mold plate 102 and bottom mold plate 101 are comprised of a plurality of hemispherical cavities 105 and 104. The cavities 104 and 105 are formed directly in the mold plates 101 and 102 or are comprised of replaceable mold cavities as set forth in U.S. Pat. No. 4,508,309, which issued to Brown (referred to hereafter as "the Brown patent"). The cavities 104 and 105 are formed with a radius substantially equal to the finished core radius. Preferably, this is in the range of about 1.50 inches to 1.65 inches as set forth above. Surrounding each of the cavities is a circumferential groove 107 for surplus outer layer material.

The center mold plate 103 includes the protrusions or buttons 106 as set forth above. Preferably, the protrusions 106 are replaceable so that different sized cavities can be formed in the outer layer cups to accommodate different sized centers. Moreover, if the protrusions are replaceably connected to the center mold plate 103, the protrusions can be easily cleaned or replaced after wear.

Since the mold plates are movable in and out of the mold press, the mold plates do not have flow channels like that described in the Brown patent. However, the mold plates are preferably made thin to reduce thermal mass and thermal response time, i.e., the mold plates have a thickness of less that about 1.5 times the cavity radius.

In order to position the top mold plate 102 in alignment with the bottom mold plate 101 and the center mold plate 103, the top mold plate 102 includes at least two pins 108 and at least two apertures 109 for receiving pins (best shown in FIGS. 12 and 12A). In the most preferred embodiment, there are four locations forming a rectangle on the top mold plate 102. The pins 108 are located diagonally across from each other at two of the locations and the apertures 109 are also diagonally across from each other at the other two locations. More preferably, the pin and aperture locations are positioned near the outside edge of the top mold plate 102.

Figure 13A:
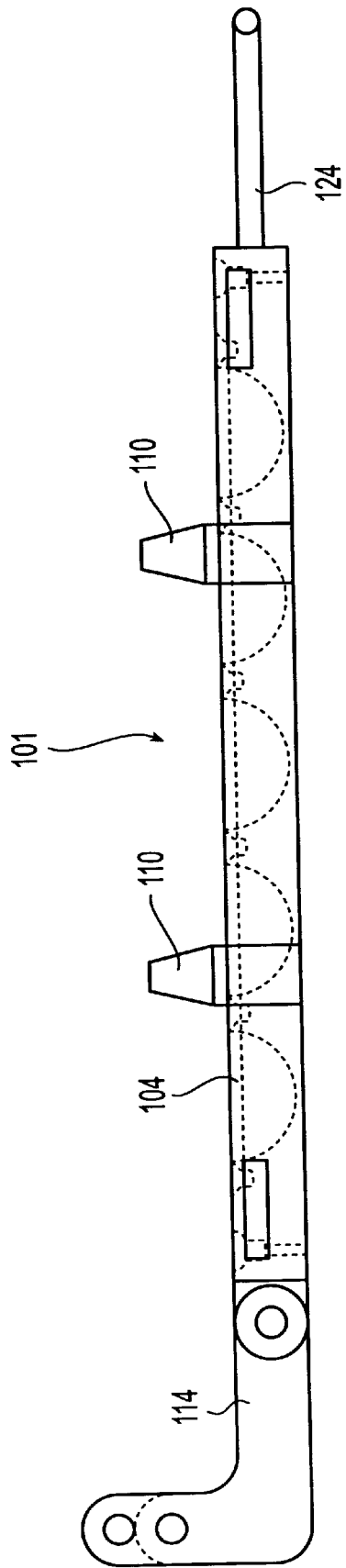
FIG. 13A is a side view of the upper mold plate of FIG. 13.

Referring to FIGS. 13 and 13A, the bottom mold plate 101 also includes two pins 110 and two apertures 111 located at similar positions to those on the top mold plate. Thus, when the top mold plate 102 is inverted over the bottom mold plate 101, the pins 110 insert into the apertures 109 and the pins 108 insert into the apertures 111 to position the mold plates relative to each other. The center mold plate 103 includes four apertures 112 such that when it is located between the top and bottom mold plates the pins 108 and 110 insert into the apertures 112 to properly position all of the mold plates relative to one another.

Referring to FIGS. 12 and 12A, the top mold plate 102 includes linking arms 113 and 115 that extend laterally from the sides of the mold plate. The arms 113 include a first lateral portion 117 and a second vertical portion 118. The vertical portion 118 defines a first vertical slot 119 therein. The slot 119 has a length that is sufficient to reach the bottom mold plate 101 when the center mold plate 103 is positioned between the bottom mold plate 101 and top mold plate 102. The vertical portion 118 further defines a second vertical slot 126. The arms 115 are comprised of a first lateral portion 120 and a vertical portion 121. The vertical portion defines a vertical slot 122.

Referring to FIGS. 13 and 13A, the bottom mold plate 101 includes linking arms 114 that extend laterally from the sides of the mold plate. Referring to FIGS. 14 and 14A, the center mold plate 103 includes linking arms 116 and 125 extending laterally from opposite sides of the plate. The arms 114, 116, and 125 define apertures associated with the slots in the top mold plate 102. Referring to FIGS. 12A, 13A, and 14A, the top mold plate arms 113 are coupled to the bottom mold plate arms 114 and the center mold plate arms 125. The top mold plate arms 115 are coupled to the center mold plate arms 116. The arms are coupled using the slot 119, apertures, and pin 120a. As one of ordinary skill will understand, the slot 119 provides the coupling between the mold plates and allows for the vertical motion of the mold plates relative to each other when they are compressed during molding. When the center mold plate 103 is folded over the top mold plate 102, apertures in the arm members 125 align with the second vertical slot 126 in arm 113 and a pin 120b can be inserted therein to lock the plates together before they are folded over the bottom mold plate 101.

As shown in FIG. 12, a plurality of spring members 123 are positioned on the top mold plate 102. As shown in FIG. 13, a plurality of spring members 122 are positioned on the bottom mold plate 101. The spring members 123 are located between the top mold plate 102 and the center mold plate 103. The spring members 122 are located between the center mold plate 103 and the bottom mold plate 101. Thus, the spring members 122, 123 keep the mold plates from compressing against each other prior to being compressed during the molding cycles, and ensure that the plates are parallel prior to closing. The spring members are sized such that they are sufficient to hold the weight of the mold plates, but do not provide significant resistance during the mold compression during the molding process.

Referring to FIGS. 12, 13 and 14, the mold plates 101, 102 and 103 can include handles 124 to facilitate the manual insertion and retrieval from the mold press or other members that can be used for automated processes.

While it is apparent that the illustrative embodiments of the invention herein disclosed fulfill the objectives stated above, it will be appreciated that numerous modifications and other embodiments may be devised by those skilled in the art, for example, a series of progressively larger diameter cups can be formed and joined by the methods disclosed. This method can also be used to form additional intermediate layers or cover layers. Therefore, it will be understood that the appended claims are intended to cover all such modifications and embodiments which come within the spirit and scope of the present invention.

What is claimed:

1. A method of making a ball, comprising:
   a) forming centers;
   b) providing a bottom mold plate with a plurality of cavities, a top mold plate with a plurality of corresponding cavities and a center mold plate with a plurality of corresponding protrusions;
   c) forming a plurality of core hemispherical cups from elastomeric material by:
      i) placing the elastomeric material in the cavities of the bottom mold plate and the top mold plate,
      ii) locating the center mold plate between the top mold plate and the bottom mold plate; and
      iii) compressing the mold plates to form the cups in the bottom and top mold plate cavities, the step of compressing the mold plates further includes elevating the temperature of the elastomeric material to a first temperature less than a cure activation temperature of the material so that the material is pliable;
   d) removing the center mold plate from between the top and bottom mold plates;
   e) placing the centers in the cups in the top mold plate;
   f) locating the bottom mold plate over the top mold plate;
   g) joining the cups around the centers to form substantially spherical cores; and
   h) molding a cover around the cores.

2. The method of claim 1, further comprising the steps of:
   coupling the bottom mold plate to the center mold plate and the top mold plate;
   folding the center mold plate over the top mold plate; and
   folding the top mold plate and the center mold plate over the bottom mold plate.

3. The method of claim 2, wherein the step of providing the bottom mold plate further includes providing protrusions on opposite sides of the center mold plate.

4. The method of claim 3, wherein the step of providing the bottom mold plate further includes providing protrusions that are substantially the same size.

5. The method of claim 2, wherein the step of providing the bottom mold plate further includes providing protrusions that are replaceably connected to the center mold plate.

6. The method of claim 2, wherein the step of coupling the bottom mold plate further includes:
   a) providing the top mold plate with linking arms with a lateral portion and a vertical portion defining a first vertical slot;
   b) providing the bottom and center mold plates with linking arms defining apertures aligned with the slots; and
   c) disposing first pins through the slots and associated apertures.

7. The method of claim 6, wherein the step of providing the top mold plate further includes the vertical portion defining a second vertical slot therein.

8. The method of claim 7, wherein the step of coupling further includes inserting a second pin through the second vertical slot and the associated aperture in the center mold plate to lock the center mold plate to the top mold plate.

9. The method of claim 1, wherein the step of joining the cups further includes elevating the temperature of the cups to a second temperature greater than the cure activation temperature.

10. A method of making a ball, comprising:
   a) forming an inner sphere by forming an inner layer having a fluid center therein;
   b) providing a bottom mold plate with a plurality of cavities, a top mold plate with a plurality of corresponding cavities and a center mold plate with a plurality of corresponding protrusions;
   c) forming a plurality of core hemispherical cups from elastomeric material by:
      i) placing the elastomeric material in the cavities of the bottom mold plate and the top mold plate;
      ii) locating the center mold plate between the top mold plate and the bottom mold plate; and
      iii) compressing the mold plates to form the cups in the bottom and top mold plate cavities,
   d) removing the center mold plate from between the top and bottom mold plates;
   e) placing the inner spheres in the cups in the top mold plate;
   f) locating the bottom mold plate over the top mold plate;
   g) joining the cups around the inner spheres to form substantially spherical cores; and
   h) molding a cover around the cores.

* * * * *